Feb. 10, 1970  G. A. DUBEY  3,494,584
MULTI-PURPOSE FUSE CUT-OUT AND INSULATOR BRACKET
Filed Oct. 31, 1968  5 Sheets-Sheet 2
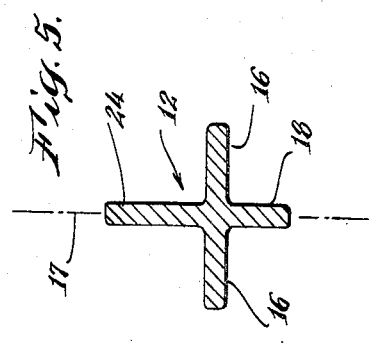
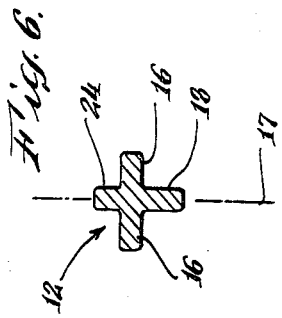
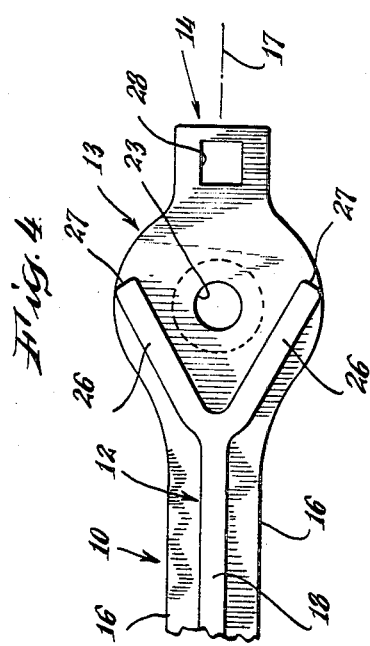
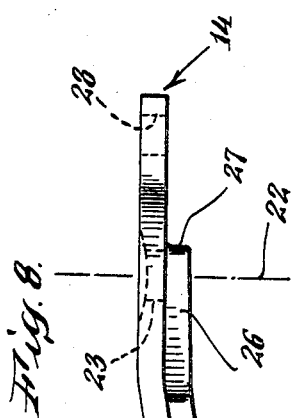
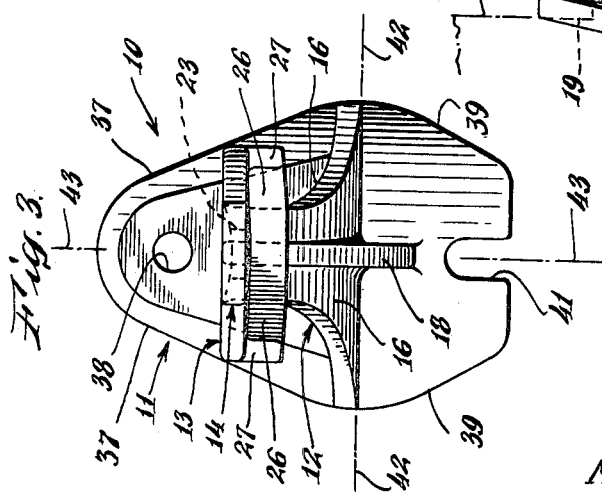
INVENTOR.
George A. Dubey
BY
Mattern, Ware & Davis
ATTORNEYS.

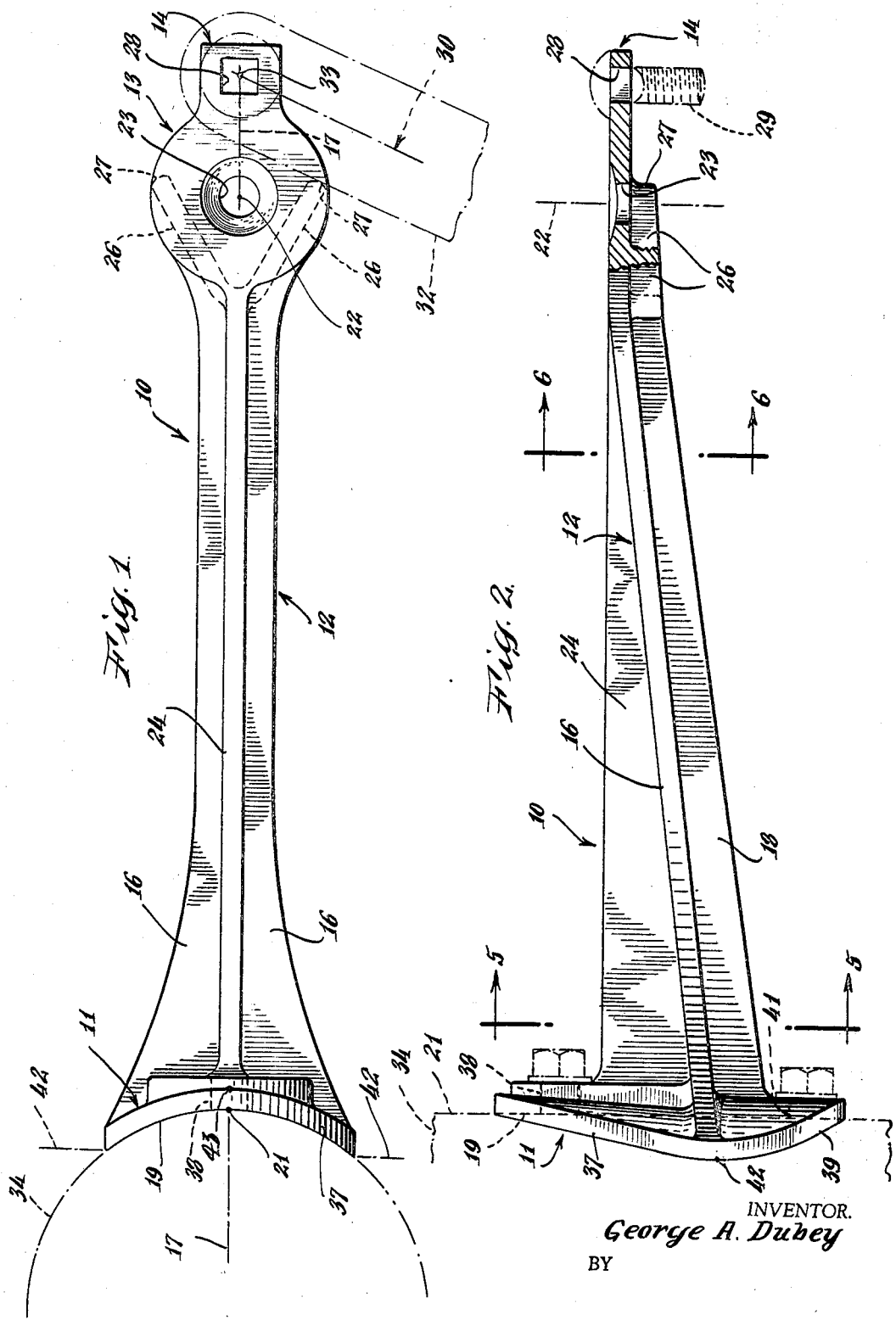

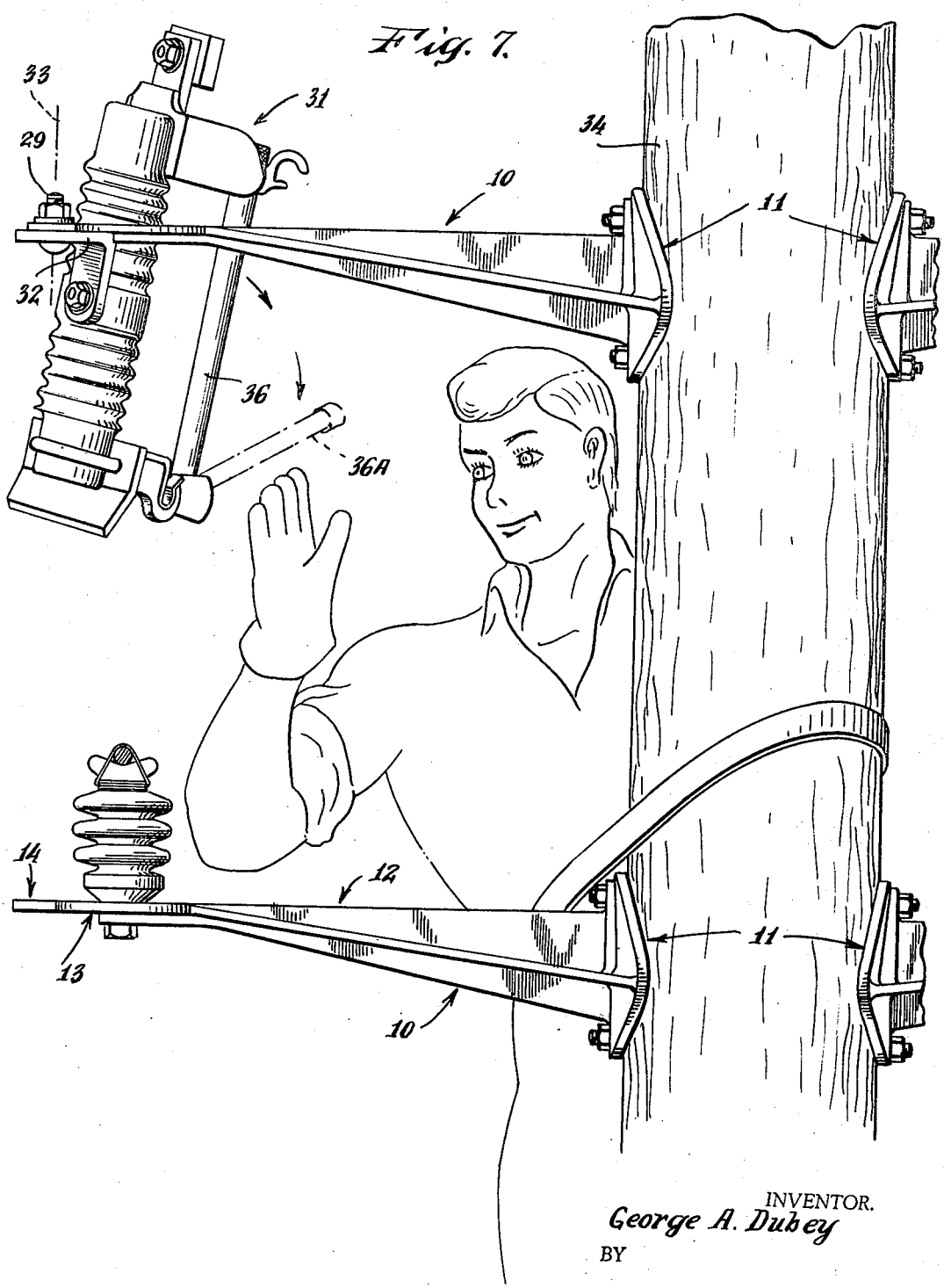

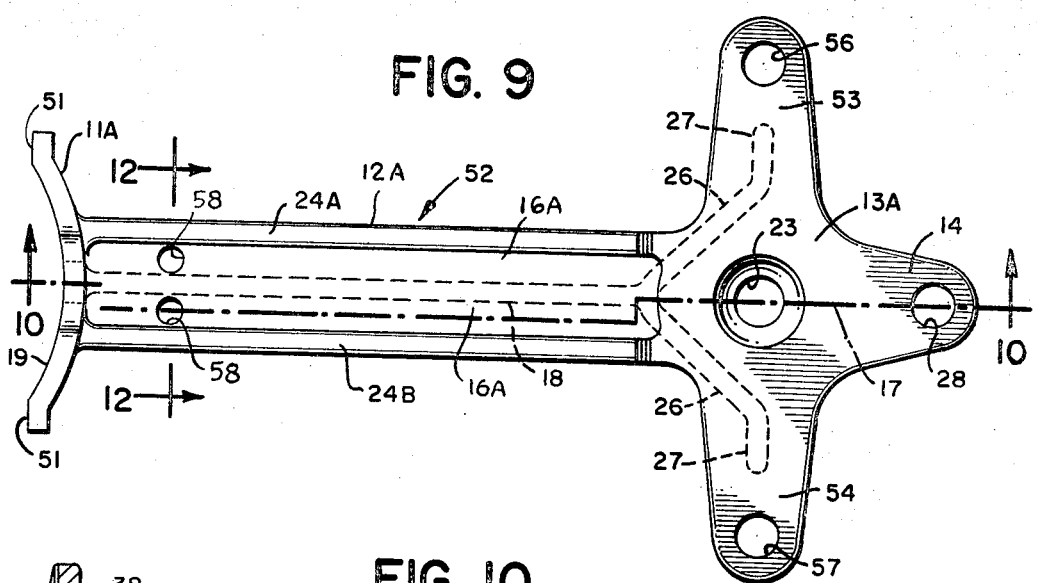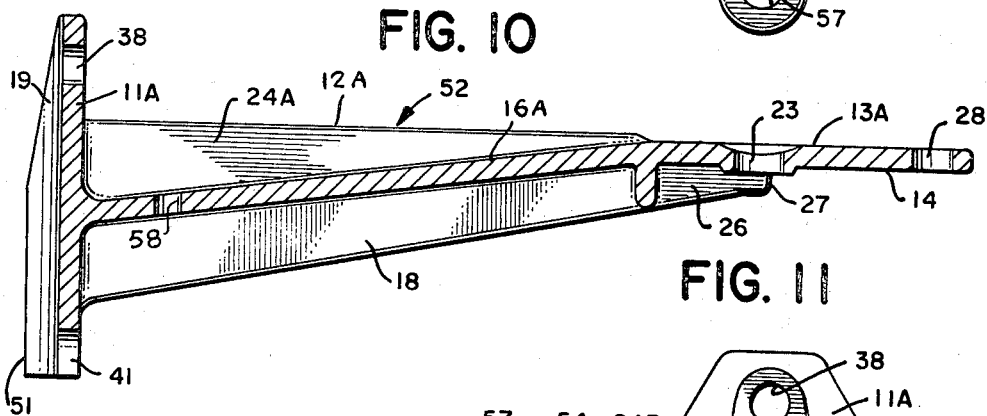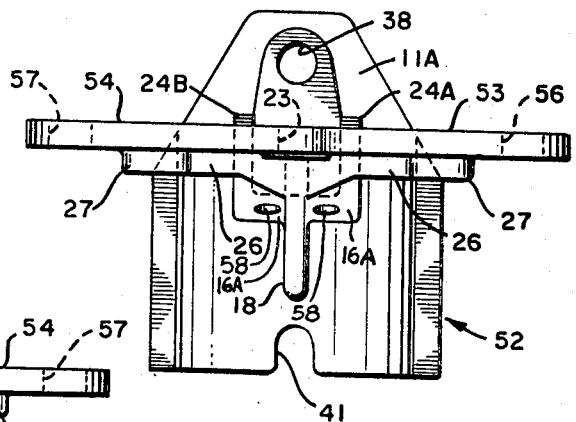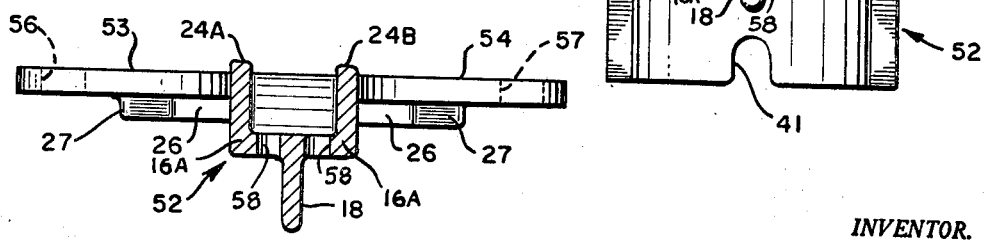

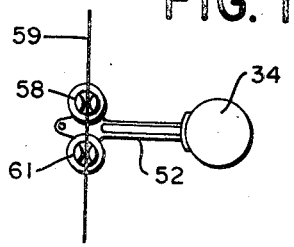
FIG. 12A
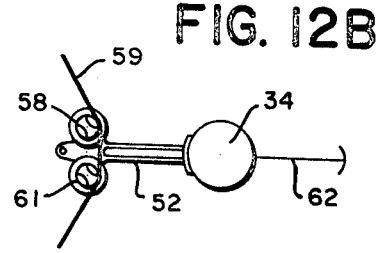
FIG. 12B
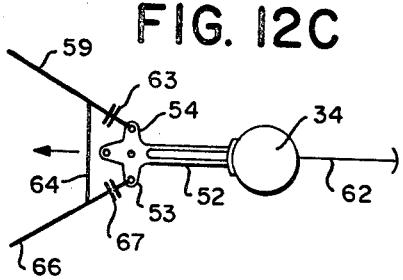
FIG. 12C
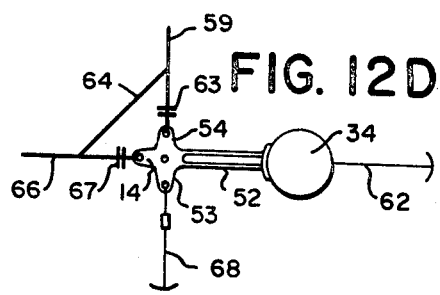
FIG. 12D
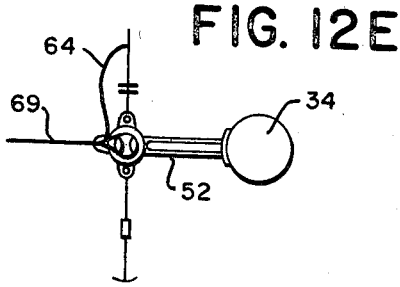
FIG. 12E
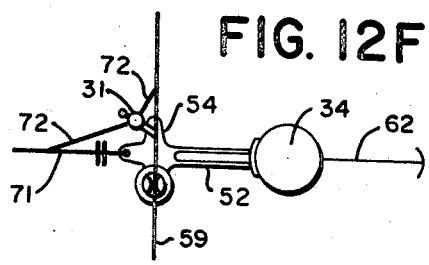
FIG. 12F
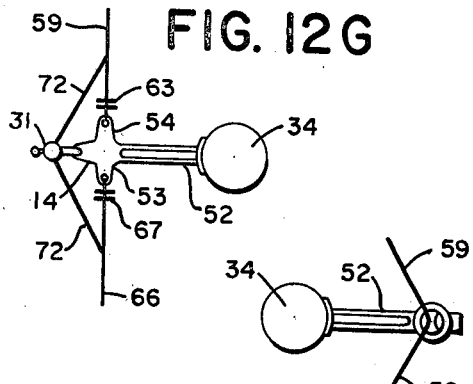
FIG. 12G
FIG. 12I
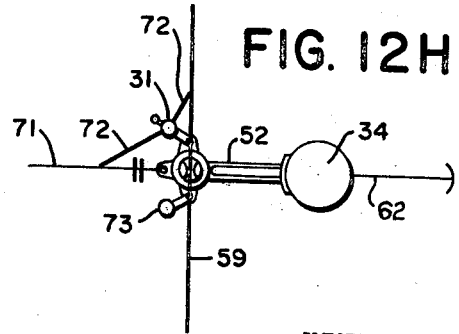
FIG. 12H
*INVENTOR.*
GEORGE A. DUBEY
BY
MATTERN WARE & DAVIS
ATTORNEYS United States Patent Office 3,494,584
Patented Feb. 10, 1970

3,494,584
MULTI-PURPOSE FUSE CUT-OUT AND INSULATOR BRACKET
George A. Dubey, Branford, Conn., assignors to MIF Industries, Inc., Branford, Conn.
Continuation-in-part of application Ser. No. 652,864, July 12, 1967. This application Oct. 31, 1968, Ser. No. 772,110
Int. Cl. F16m 13/02
U.S. Cl. 248—221
10 Claims

ABSTRACT OF THE DISCLOSURE

Cantilever fuse cut-out and insulator brackets for installation on power line poles, each incorporating a tapered cantilever arm extending from a saddle-curved pole-engaging base outward to an insulator-supporting platform provided with one or more lugs for mounting insulators or fuse cut-outs, with the tapered arm having laterally-extending, upwardly-slanted rib means transmitting sidewise loads to the supporting power line pole, and with a downwardly extending tapered compression web underlying these ribs along the major portion of the length of the tapered arm and provided at its outer end with diverging forked web ends underlying the insulator supporting platform.

RELATED APPLICATION

This application is a continuation-in-part of my copending parent application entitled "Fuse Cut-Out and Insulator Bracket," Ser. No. 652,864, filed July 12, 1967, now abandoned.

BACKGROUND OF THE INVENTION

With steadily increasing demands for electrical power and electrical communication equipment, growing numbers of overhead power and communication cables have been required for many decades past. As a result, power and communication cables in urban areas are now generally concealed in underground wiring ducts for convenient maintenance and to obviate aesthetic objections to large numbers of overhead wires and cables above city streets. In suburban and rural areas, however, power and communication cables are generally supported from utility poles, mounted on wooden crossarms or metal or plastic insulator support brackets.

Attractively styled support brackets are generally regarded as aesthetically more pleasing than timber crossarms, for brackets may provide an upwardly sloping, tapered shape suggesting tree limbs and branches. In addition, brackets take advantage of the superior tensile and compressive stress limits of malleable cast iron or fiber-filled or fabric-laminated resin construction, for example, and therefore heavy transmission line loads can be carried on slim, tapered support brackets, eliminating the need for bulky, awkward, timber crossarms and providing sturdy resistance against shock loads, wind or ice loads and the like.

Support brackets have been proposed in numerous shapes and sizes, but such conventional support brackets provide no facility for mounting both line supporting insulators and fuse cut-out devices for convenient installation and operation. For this reason, fuse cut-out assemblies have required special mounting hardware, often custom made. Moreover, many fuse cut-outs have "drop-away" angularly movable fuses which must be unlatched, moved pivotally, replaced, repositioned and relatched in an arcuate angular movement. These devices have heretofore required custom mounting hardware, since conventional insulator support brackets have failed to provide suitable mountings for orienting these devices in operating positions accessible to utility linemen.

Furthermore, such conventional support brackets have failed to provide economical, sturdy, lightweight tapered-arm construction and upwardly slanting graceful appearance coupled with multiple-purpose capabilities for simultaneously supporting fuse cut-out devices together with one, two or more post insulators for through-going conductors, disk insulators for dead-ended conductors, downguy attachments, span-guy attachments, lateral dropwire take-off conductors or underground riser conductors, in various combinations on the same bracket.

SUMMARY OF THE INVENTION

The support brackets of this invention afford versatile capability for performing all of the functions of timber crossarm power line construction with lightweight, attractive armless brackets. This has resulted in a group of brackets embodying the principles of the present invention permitting a "total armless concept" of power line construction.

Accordingly, a principle object of this invention is to provide a family of support brackets capable of simultaneously supporting cable-carrying insulators, guy attachments, fuse cut-out and arrester devices, transformers, underground risers and the like.

Another object of the invention is to provide such support brackets, formed in lightweight, sturdy structural configuration with rigid stiffness resisting vertical or or lateral deformation under normal or shock loads or mechanical overloading caused by ice and wind.

A further object of the invention is to provide such support brackets each incorporating a pole engaging base member having a configuration offering maximum resistance to over-turning vertical or lateral displacement of the support bracket in crushing engagement with the utility pole, while providing maximum stiffening rigidity to the overall bracket structure.

Another object of the invention is to provide such support brackets each incorporating a tapered cantilever arm portion providing an aesthetically pleasing and attractive overall appearance.

A further object of the invention is to provide such support brackets incorporating an angularly upward-sloping configuration suggesting tree limbs and branches when installed on utility poles.

Other and more specific objects will be apparent from the features, elements, combinations and operating procedures disclosed in the following detailed description and shown in the drawings.

THE DRAWINGS

FIGURE 1 is a top plan view of a support bracket embodying the present invention;
FIGURE 2 is a side elevation view of the support bracket shown in FIGURE 1;
FIGURE 3 is an end elevation view of the support bracket shown in FIGURES 1 and 2;
FIGURE 4 is a fragmentary bottom plan view of the insulator-supporting platform at the outer end of the support bracket shown in the foregoing figures;
FIGURES 5 and 6 are sectional elevation views taken along the lines 5—5 and 6—6 in FIGURE 2;
FIGURE 7 is a fragmentary schematic view showing support brackets of this invention installed on a utility pole, supporting both an insulator and a fuse cut-out device in convenient operating position for manual installation, operation and replacement by a utility lineman;

FIGURE 8 is a side elevation view of a smaller support bracket constituting a modified embodiment of the invention;

FIGURE 9 is a top plan view of still another modified embodiment of the invention having a support platform capable of mounting three or four different devices;

FIGURE 10 is a sectional side elevation view of the bracket of FIGURE 9;

FIGURE 11 is an end elevation view of the bracket of FIGURE 9;

FIGURE 12 is a cross sectional elevation view of the bracket of FIGURE 9, taken along the line 12—12 in FIGURE 9; and FIGURES 12A through 12I are schematic top plan views of different installations of the bracket of FIGURE 9 on a utility pole, illustrating its multiple purpose capability.

SPECIFIC DESCRIPTION

The support brackets of this invention are sturdy, lightweight and pleasingly designed, generally manufactured as castings of such materials as malleable cast iron. These brackets are formed as unitary, integral structures incorporating three principal portions: a pole-engaging base, a cantilever arm extending outwardly from the base and an insulator supporting platform integrally formed at the outer end of the cantilever arm.

A typical support bracket 10 embodying the present invention is shown in the figures, incorporating a pole-engaging base portion 11, a cantilever arm portion 12 and an insulator-supporting platform 13, terminating in an outwardly extending, apertured mounting lug 14. All of these portions of the support bracket 10 are configured for optimum cooperation with each other, providing an extremely sturdy, lightweight support bracket, and also producing a bracket having an aesthetically pleasing appearance.

CANTILEVER ARM

The cantilever arm portion 12 of the illustrated support bracket embodying this invention is provided with an outwardly-diminishing taper, as shown in the drawings. This provides a lightweight structure having maximum resistance to bending in the region of maximum bending moment, near the base 11. The arm portion 12 preferably comprises a lightweight tapered beam having laterally extending ribs 16 on each side of the arm 12. Each of the ribs 16 extends laterally outwardly symmetrically from the central vertical plane 17 of the bracket 10. Extending downward from the junction of the ribs 16 in the vertical plane 17 is an underlying compression web 18, forming with the ribs 16 a "T-shaped" cross section, as shown in FIGURES 5 and 6.

The support brackets of this invention may be formed in various lengths, preferably incorporating nominal lengths of the arm 12 of seven inches, twelve inches and eighteen inches. A small support bracket of nominal "seven-inch" length is shown in FIGURE 8, while FIGURES 1 through 7 show a large, "eighteen-inch" bracket. These lengths are measured from the intersection of the vertical plane 17 with the pole-engaging face 19 of the base portion 11, along a central base axis 21 and are measured along a line lying in vertical plane 17 and extending perpendicular to the central base axis 21 outward to the preferably parallel axis 22 of a cylindrical insulator-mounting aperture 23 formed centrally in the insulator support platform 13, as shown in FIGURES 1 and 2. These size dimensions thus indicate the nominal distance between the axis of an upstanding, cable-supporting electrical insulator mounted on the platform 13, and the nearest surface of the utility pole 34 upon which the support bracket 10 is mounted.

In the larger sizes of the support brackets 10, such as the nominal "eighteen-inch" size shown in FIGURES 1–7, the tapered cantilever arm 12 preferably incorporates an additional structural feature, a vertically extending tensile web 24 projecting upward from the junction of the two laterally extending webs 16 in the vertical plane 17 forming an upward extension of the compression web 18 providing a "cruciform" cross section for the tapered cantilever arm portion 12 of the bracket 10, as shown in FIGURES 5 and 6, which has an enhanced resistance to vertical bending moments.

The modified embodiment 52 of FIGURES 9 through 12G incorporates two vertically extending tensile webs 24a and 24b, as shown in FIGURE 12.

It will also be noted from the drawings that the upper edge of the tensile web 24 and the lower edge of the compression web 18 are not parallel, but converge slightly toward each other, being farther apart at the base portion 11 of the support bracket 10 than at the insulator supporting platform 13. These extreme edges of the tensile web 24 and the compression web 18 are preferably converging straight lines, but they may have suitable curved fillets at the points where the webs join the base 11 of the bracket, and smoothly blending curves at the points where they merge in the insulator supporting platform 13, as shown in FIGURES 1 and 2.

INSULATOR-SUPPORTING PLATFORM

Platform 13 is integrally formed at the outer end of arm 12, and the compression web 18 is provided with diverging, forked outer ribs 26 extending along the underside of platform 13 from a smoothly blended bifurcation of web 18 near the preferably circular periphery of the insulator-supporting platform 13 at the point where it is joined by arm 12. As shown in FIGURE 4, these forked outer ribs 26 preferably flank the insulator mounting aperture 23 in diverging, non-parallel relationship, ending in outspread rib ends 27 on the underside of platform 13. In this manner these forked ends 26 provide sturdy underlying support for the platform 13, serving to strengthen and stiffen this platform in a highly effective manner while transmitting normal loads as well as wind or ice overloads and shock loads directly to the arm portion 12 by way of the compression web 18 as well as the laterally extending ribs 16.

The diverging rib ends 27 serve as the terminations of the diverging, non-parallel outer compression ribs underlying the insulator supporting platform 13, as shown most clearly in FIGURE 4, and these terminal ends 27 preferably are located along the peripheral edge of the platform 13 at points between the insulator mounting aperture 23 and a mounting aperture 28 formed in an outwardly extending mounting lug 14 protruding from the extreme outer end of the platform 13 in the direction away from the pole-engaging base 11, in the bracket of FIGURE 1.

The mounting aperture 28 is shown as a square hole in FIGURES 1 and 4, positioned to accommodate a square neck beneath an enlarged head at the upper end of the shank of a mounting bolt 29 shown in FIGURES 2 and 7, which is employed to secure a fuse cut-out assembly 31 to the mounting lug 14, as shown in FIGURE 7. By terminating at points less than midway between the apertures 23 and 28, the extreme outer rib ends 27 of the forked diverging underlying ribs 26 beneath platforms 13 are positioned to avoid interference with the pole-facing edge of a fuse cut-out assembly mounting plate 32. This permits the fuse cut-out assembly 31 to extend from aperture 28 in a vertical plane 30 angularly displaced in a direction toward the pole-engaging face 19 of the base 11, rather than in a transverse plane perpendicular to plane 17. Thus the fuse cut-out assembly 31 may be installed in a vertical plane 30 converging with the vertical bracket plane 17 along an axis 33 of the mounting aperture 28, and forming with the vertical plane 17 an acute angle, as indicated schematically in FIGURE 1. This acute angle mounting of the fuse cut-out assembly 31 positions this assembly for convenient manipulation by a lineman on the pole 34 to which the pole-engaging base 11 of the bracket 10 is secured.

Convenient access to fuse cut-out assemblies 31 is important to public utility maintenance personnel, since these assemblies generally require angular manipulation of such structural portions as the removable fuse 36 shown in FIGURE 7. In the type of fuse cut-out assembly 31 shown in FIGURE 7, the fuse 36 is replaced by unlatching its upper end and pivoting the fuse 36 outwardly about a pivoting socket enclosing its lower end to the dashed position 36A shown in FIGURE 7. When this pivoting movement of the fuse 36 occurs in the angularly displaced mounting plane 30, shown in FIGURE 1, intersecting vertical plane 17 at an acute angle, the pivoted fuse 36A is nearer pole 34 than is mounting lug 14. This orientation thus presents the fuse 36 and other portions of the fuse cut-out assembly 31 for convenient manipulation by a lineman on pole 34.

Accordingly, this converging plane mounting orientation for such auxiliary equipment as fuse cut-out assembly 31 thus provides convenient access for ready manipulation by utility maintenance personnel. The positioning of the extreme outer rib ends 27 of the diverging underlying compression ribs 26 beneath platform 13 thus has important operating advantages in the cooperative installation of bracket 10 with such auxiliary units, which are often required to protect power lines and communication cables from service interruptions which might be caused by high overload current surges resulting from lighting, for example.

POLE-ENGAGING BASE

The pole-engaging base 11 at the opposite end of bracket 10 from the insulator-supporting platform 13 is also designed for optimum structural cooperation and effective transmission of loading stress from the arm portion 12 to the supporting pole 34. As shown most clearly in FIGURE 3, the base 11 is preferably formed in a parallelogram oval or diamond shape, with its "corners" smoothly curved and rounded off. As shown in FIGURE 3, the generally diamond-shaped periphery of base 11 is provided by a first major axis 42 of maximum horizontal width coinciding with the base-end of the laterally extending ribs 16, and a second perpendicular major axis 43 of maximum vertical height lying in the vertical plane of symmetry 17.

The horizontal midsection of the base 11 is therefore the widest part of the base, occurring at the horizontal plane defined by axis 42 in which the base 11 blends with the adjoining ends of the laterally extending ribs 16. The outer edges of ribs 16 are smoothly curved to blend uniformly with the outer edge of base 11 at each side thereof, thus providing firm structural support for these ribs 16 to resist their deflection by windage or shock loads, such as those resulting from the inadvertent breaking of a supported cable, which might produce sudden, lateral deflection of the support bracket 10. Such loads are easily transmitted by either rib 16 to the base 11 at its widest portion, and consequently are re-transmitted by being distributed over the entire compressed half of the pole-engaging face 19 of the base 11, thus minimizing lateral "overturning" deflection tending to crush or indent the face of pole 34.

The converging upper edges 37 of base 11 flank a base mounting aperture 38 accommodating a through bolt or spike for anchoring pole engaging base 11 to pole 34, as shown in FIGURE 3. The lower converging edges 39 of the parallelogram or diamond-shaped base 11 likewise flank a second base-mounting aperture, preferably formed as an anchor slot 41 opening to the lower end of base 11, for convenience in mounting bracket 10 on pole 34. The vertical height of base 11 accommodates the overall total height of the adjoining ends of compression web 18, tensile web 24 and ribs 16, and the anchoring bolts or spikes installed in aperture 38 and slot 41, thus providing sturdy support for the arm 12 and producing uniform transmission of loads and stresses.

As shown in FIGURE 2, the laterally-extending ribs 16 are preferably slanted upward from base 11 toward platform 13 and the converging outermost edges of webs 18 and 24 likewise form an upwardly slanted tapered triangle shape lying in plane 17, giving the support bracket 10 an overall upward taper which provides a position for the insulator mounted in insulator mounting aperture 23 extending well above the base 11, and thus positions the utility cables supported by the insulator remotely spaced above the support bracket 10 and its base 11. This upwardly slating configuration of the arm portion 12 of support bracket 10 provides an aesthetically pleasing appearance, widely accepted in preference to the clumsy, awkward appearance of timber crossarms on power lines and communication line poles.

MULTIPLE PURPOSE BASE

As shown in FIGURES 9 and 10, the upwardly slating arm may also be combined with a different base 11A having vertically extending flat edge faces 51 lying in a common plane perpendicular to the vertical plane 17. These edge faces 51 provide abutting seating areas of substantial size when the bracket 52 is mounted on flat-sided poles, such as concrete poles of square or polygonal cross section. The faces 51 are positioned along the extreme lateral edges of the base 11A, providing stable, wide-spaced support, again resisting sidewise deflection from windage, shock loading or the like.

Faces 51 preferably flank the pole-engaging face 19 of base 11A, adapting the bracket 52 for mounting upon either round or flat-faced poles of concrete, steel, aluminum or other materials.

The cantilever arm portion 12A comprising laterally-extending stiffening ribs 16A—16A and an underlying compression web 18 further includes two upwardly extending tension webs 24A and 24B of outwardly diminishing height extending from the base 11A along the length of the arm to the support platform 13A whereby the support platform is capable of resisting upward overturning moments and compression forces. Drain apertures 58—58 between the tension ribs 24A and 24B pass vertically through the laterally-extending stiffening ribs 16A—16A at each side of the compression web 18 near their junction with the base 11A.

MULTIPLE PURPOSE SUPPORTING PLATFORM

The modified bracket 52 shown in FIGURES 9 through 12 also incorporates a multiple purpose platform 13A having three outwardly extending mounting lugs, lug 14 extending along axis 17 away from pole engaging face 19, and two transverse lugs 53 and 54 respectively provided with mounting apertures 56 and 57 and extending sidewise in opposite directions perpendicular to axis 17 of the bracket 52.

In bracket 52, the mounting apertures 23, 28, 56 and 57 are all available for supporting different devices, as illustrated in FIGURES 12A through 12G.

Bracket 52 satisfies the National Electric Safety Code "Grade B Construction" requirement for dual insulator pin support of each conductor for railroad, highway and river crossings, providing a second insulator pin 58 to support conductor 59 in case a first insulator pin 61 should fail (FIGURE 12A).

Lateral curvature of the line 59 tending to bend and break the pins supporting insulators 58 and 61 may be divided between the two insulator pins (FIGURE 12B), permitting doubly sharp total bend angles for conductor 59 at each pole 34, counteracted by an anchor guy 62 opposite conductor 59.

If circumstances require line bend angles that are sharper still, the conductor 59 may dead end at a disk insulator 63 (FIGURES 12C, 12D), to be connected by a jumper cable 64 to an adjacent conductor 66 dead-ended at a second disk insulator 67. In FIGURE 12C, disk insulators 67 and 63 are secured in apertures 56 and 57 of transverse lugs 53 and 54, with the tension load counteracted by pole guy 62. In FIGURE 12D, disk insulators 67 and 63 are mounted in lug 14 and lug 54, while a bracket guy 68 supplements pole guy 62 in counteracting the pole-overturning force of the tension load of conductors 59 and 66. FIGURE 12E shows a variation of FIGURE 12D in which a flexible take-off conductor 69 from a pin supported insulator mounted in central aperture 23 of platform 13A replaces conductor 66. If conductor 69 is not under a tension load, pole guy 62 may be omitted, as in FIGURE 12E.

Installations of fuse cut-out units such as unit 31 of FIGURE 7 are shown schematically in FIGURES 12F, 12G and 12H. A fuse cut-out 31 anchored to lug 54 and series connected between two parts of jumper cable 72 may protect the lateral take-off conductor 71 without affecting through-going conductor 59 supported by a pin insulator mounted on lug 53. This eliminates the need for an extra pole-mounted bracket merely to support the fuse cut-out 31.

In FIGURE 12G, a bracket 52 is used to "sectionalize" a circuit by installing fuse cut-out 31 on lug 14 and connecting it in series between two parts of jumper 72 joining two conductors 59 and 66 dead-ended on disk insulators 63 and 67 to lugs 54 and 53. Prior to the invention of bracket 52, this installation required dead-ending disk insulators installed directly on the pole in the in-line position, with a first bracket carrying the jumper cable around the pole, and a second bracket supporting the fuse cut-out. The cost of one bracket is thus saved by the installation of FIGURE 12G.

FIGURE 12H shows a further versatile capability of bracket 52 for supporting fuse cut-out 31 and an arrester unit 73 respectively mounted on lugs 54 and 53, cooperating with through-going conductor 59 secured to a pin mounted insulator anchored to the center aperture of support platform 13.

FIGURE 12I shows a bracket of this invention employed in corner construction "against the pole," with conductor 59 carried by a pin type insulator on the bracket "behind" pole 34, placing the bracket in compression and producing an upward over-turning force about its base 11 which is counteracted by upwardly extending ribs 24A and 24B (FIGURES 9 and 10). In a typical size, such a bracket withstands a tensile load in conductor 59 carried by a single insulator which exceeds the maximum transverse "cantilever strength" rating of the insulators commonly used.

The foregoing description shows that all of the insulators, guys, cut-outs, arresters and conductors employed in normal power line construction may be efficiently and economically mounted using the brackets of the type shown in FIGURES 1, 8 and 9. All degress of tangent and angle construction may be achieved while maintaining specified pole conductor clearance of 7 inches, 12 inches or 18 inches, and single-phase and three-phase lateral take-off conductors are easily secured to the line conductor supporting brackets.

Brackets 52 require no separate adapter plates or extra castings, bolts or fabrications of any kind.

Particularly where overhead line appearance is considered an important factor, the brackets of this invention fill an important need of operating power companies for attractive, efficient and economical armless brackets, completely eliminating ungainly timber crossarms.

What is claimed is:
1. A support bracket adapted to extend inwardly from a utility pole and comprising
   (A) a pole-engaging base having a concavely-curved pole-engaging face having a central vertical axis adapted to lie in a vertical plane coinciding with the vertical axis of the pole and extending outwardly from the pole,
   (B) a support platform outwardly spaced away from the base, having a vertical bolt-receiving mounting aperture having its axis lying in said vertical plane,
   (C) a cantilever arm extending between and integrally joining the platform and the base, having an outwardly diminishing taper with its maximum cross-sectional area adjacent to the pole-engaging base, and including lateral stiffening ribs extending laterally at opposite sides of said vertical plane and joined at their outer ends with said platform, and a downwardly extending central compression web lying in said vertical plane longitudinally coextensive with said lateral ribs and forming therewith a T-shape cross-section,
   (D) mounting lug means positioned at the outer end of the platform, having a vertical bolt-receiving aperture having its axis lying in said vertical plane, and
   (E) a pair of stiffening ribs integrally formed on the underlying surface of the platform diverging from the outer end of said compression web forming a substantially V-shape rib formation flanking said bolt-receiving aperture of said platform, and having outwardly-extending terminal ends spaced inwardly from the mounting lug means to accommodate mounted devices secured to the mounting lug means.

2. The support bracket defined in claim 1, wherein said pole-engaging base has a region of maximum horizontal width at a position near its horizontal midsection, and wherein said stiffening ribs join and terminate on the base near its region of maximum horizontal width.

3. The support bracket defined in claim 5, wherein the base is provided with a generally diamond-shaped periphery having a first major axis lying in the region of maximum horizontal width, and a second major axis lying in the region of maximum vertical height and perpendicular to the first major axis.

4. The support bracket defined in claim 1, wherein the cantliver arm further includes an upwardly-extending central tension web of outwardly diminishing height lying in said vertical plane longitudinally coextensive with said lateral ribs providing with the compression web and the laterally-extending ribs a cantilever arm having a cruciform cross-section over the major portion of its length.

5. The support bracket defined in claim 2, wherein the cantilever arm is provided with an outwardly slanted pitch, positioning objects carried by the support platform outwardly and above the region of maximum horizontal width of the base.

6. The support bracket defined in claim 1, including two auxiliary mounting lugs protruding outward from the support platform, each having a bolt-receiving aperture, said apertures of said first mentioned mounting lug means and said two auxiliary mounting lug means being spaced radially outwardly in different directions from the axis of said aperture of said support platform and angularly spaced from each other by right angles.

7. The support bracket defined in claim 1, wherein the cantilever arm further includes two upwardly extending tension ribs of outwardly diminishing height extending from the base along the length of the arm to the support platform, whereby the support bracket is capable of resisting upward overturning moments and compressive forces.

8. The support bracket defined in claim 7, further including drain aperture means between the tension ribs passing vertically through the laterally-extending stiffening rib portion of the arm near the lowest section thereof.

9. The support bracket defined in claim 5 wherein the region of maximum horizontal width of the base extends vertically over a substantially portion of the height of the base, further including vertically extending flat edge faces lying in a common plane and flanking the curved pole-engaging face.

10. A support bracket adapted to extend outwardly from a utility pole and comprising
  (A) a pole-engaging base,
  (B) a support platform outwardly spaced away from the base, having a vertical bolt-receiving aperture,
  (C) a cantilever arm extending between and integrally joining the platform and the base,
  (D) mounting lug means positioned at the outer end of the platform having a vertical bolt-receiving aperture, and
  (E) two auxiliary mounting lug means protruding outward from the support platform, each having a bolt-receiving aperture, said apertures of said first mentioned mounting lug means and said two auxiliary mounting lug means being spaced radially outward in different directions from the axis of said aperture of said platform and angularly spaced from each other by right angles.

References Cited

UNITED STATES PATENTS

| | | | |
|---|---|---|---|
| 1,077,727 | 11/1913 | Loepsinger | 248—70 |
| 1,097,533 | 5/1914 | Cline | 248—14 |
| 2,911,171 | 11/1959 | Chaille | 248—65 |
| 2,957,505 | 10/1960 | Marzili | 248—221 X |
| 3,369,788 | 2/1968 | Eisele | 248—221 |

FOREIGN PATENTS 750,714  8/1933  France.

ROY D. FRAZIER, Primary Examiner

J. FRANKLIN FOSS, Assistant Examiner

U.S. Cl. X.R.

174—158; 248—65

UNITED STATES PATENT OFFICE
CERTIFICATE OF CORRECTION

Patent No. 3,494,584                                    February 10, 1970

George A. Dubey

It is certified that error appears in the above identified patent and that said Letters Patent are hereby corrected as shown below:

Column 2, line 35, cancel "or", first occurrence. Column 4, line 64, "platforms" should read -- platform --. Column 6, lines 15 and 21, "slating", each occurrence, should read -- slanting --; line 57, "degress" should read -- degrees --; line 71, "inwardly" should read -- outwardly --. Column 8, line 26, after "accommodate" insert -- diagonally --; line 33, "claim 5" should read -- claim 2 --; line 47, after "outwardly" insert -- upward --; line 70, "claim 5" should read -- claim 2, --; line 72, "substantially" should read -- substantial --.

Signed and sealed this 21st day of July 1970.

(SEAL)
Attest:

Edward M. Fletcher, Jr.                          WILLIAM E. SCHUYLER, JR.
Attesting Officer                                            Commissioner of Patents